March 14, 1967
M. URBINATI
3,308,766
GUIDING ARRANGEMENT FOR RAILROAD-TYPE VEHICLES
EQUIPPED WITH PNEUMATIC TIRES
Filed April 3, 1964
3 Sheets-Sheet 1
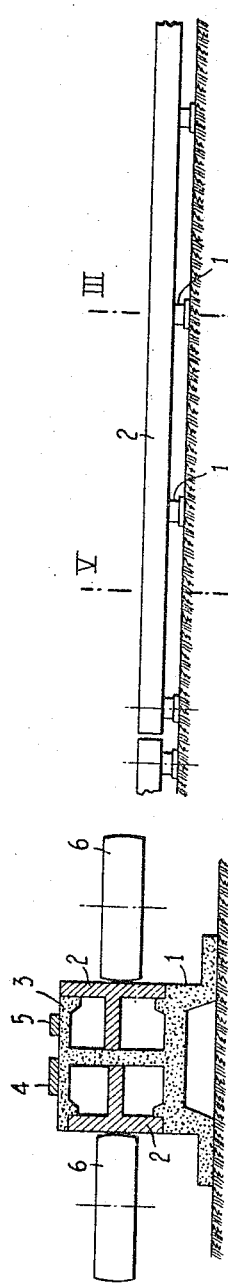
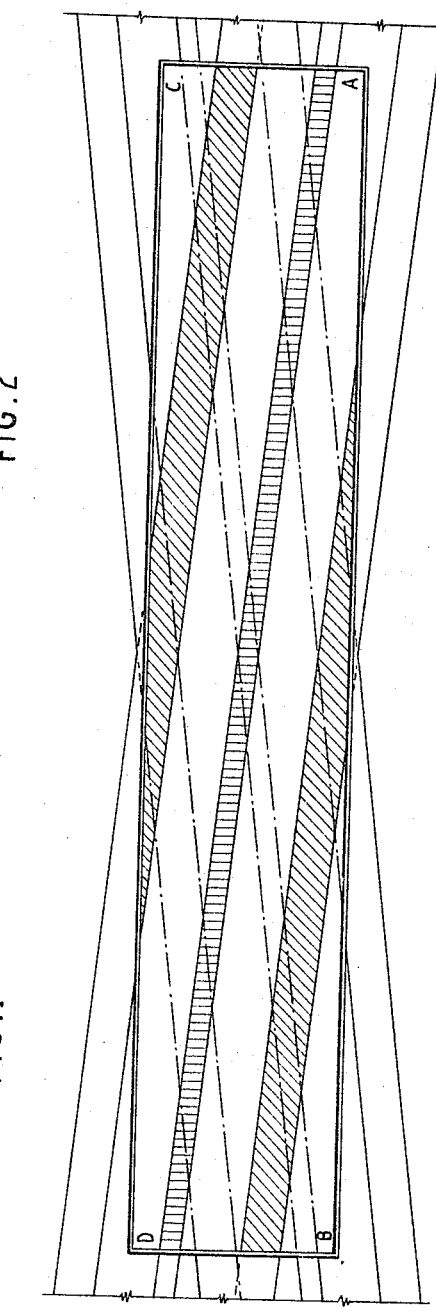
INVENTOR
Mario Urbinati
BY Wenderoth, Lind & Ponack
ATTORNEYS

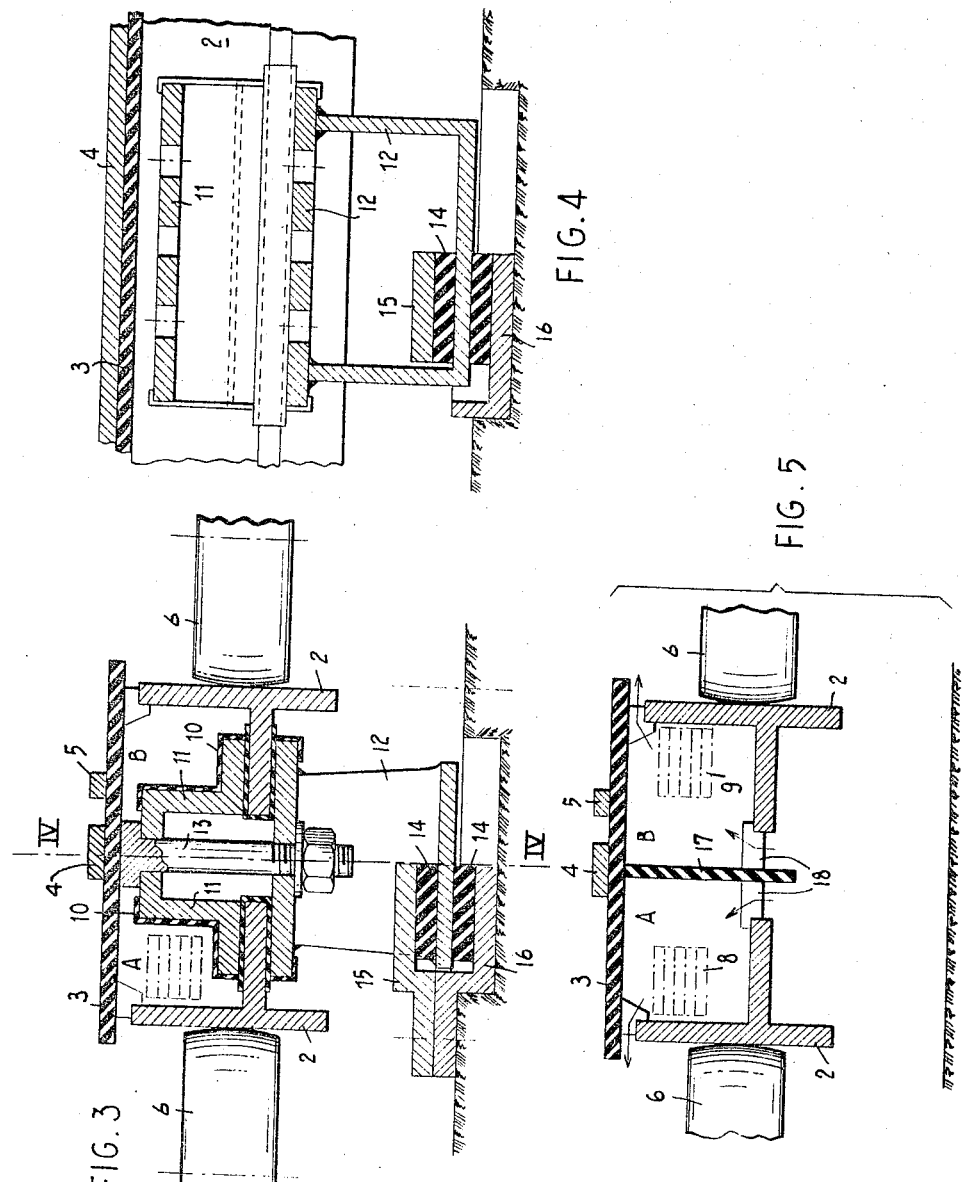

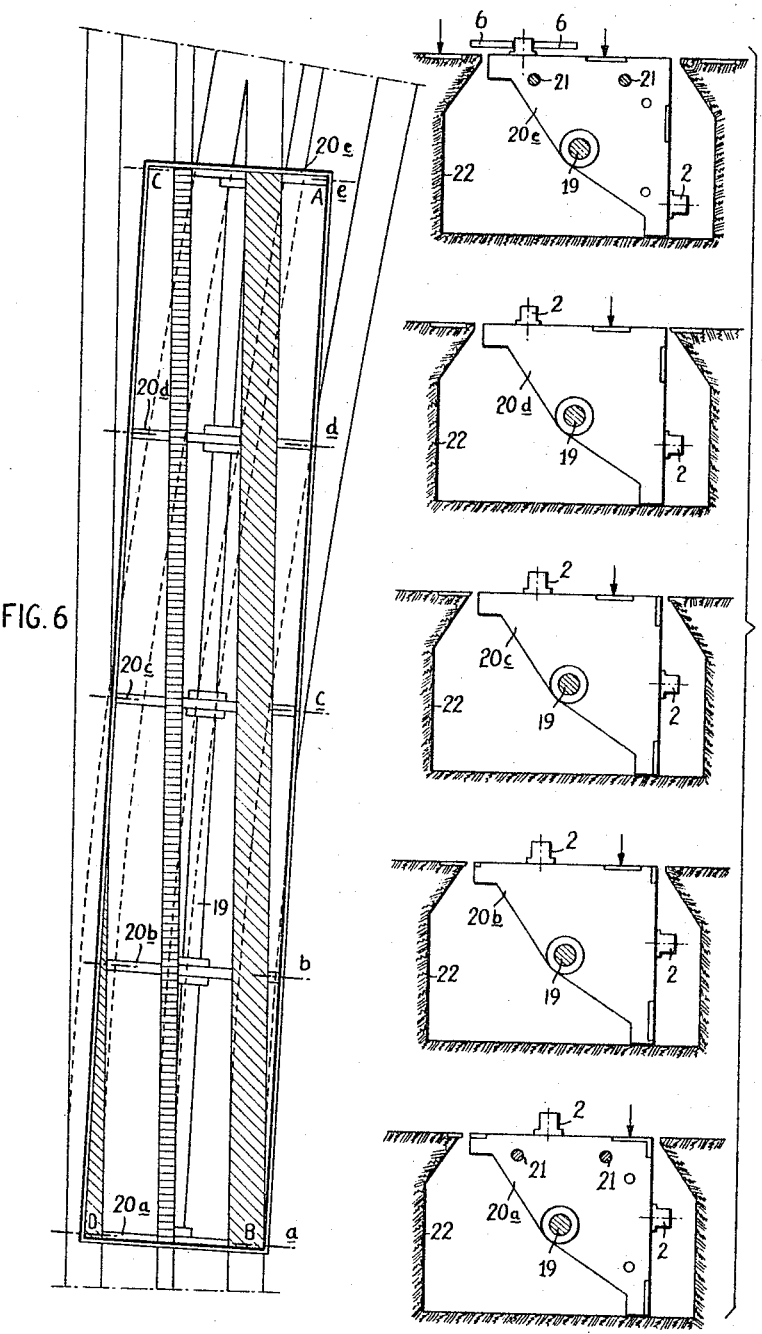

United States Patent Office 3,308,766
Patented Mar. 14, 1967

3,308,766
GUIDING ARRANGEMENT FOR RAILROAD-TYPE VEHICLES EQUIPPED WITH PNEUMATIC TIRES
Mario Urbinati, 101 Circonvallazione Appia,
Rome, Italy
Filed Apr. 3, 1964, Ser. No. 357,248
Claims priority, application Italy, Apr. 20, 1963,
7,870/63
9 Claims. (Cl. 104—119)

The present invention refers to a guiding and switching assembly for railroad vehicles equipped with pneumatic tires. More particularly, the invention relates to a roadway system for electric railroad vehicles provided with pneumatic tires, having the guiding and feeding assembly axially arranged to the track. The invention is particularly useful for carrying out district lines (underground, surface and overhead lines) insofar as the roadway problems are concerned.

In the present specification, with the term "roadway" it is meant the assembly comprising the track on which the tires of the rolling stock rotate, the guide which forces the vehicles to follow the track, the electric feed line of the vehicles and the possible lines of the signaling and ground circuits.

In the conventional district lines, the feed line is formed by the rails in cooperation with the so-called "central contact rail" and the signaling one is provided by the through tracks.

The object of the invention is to provide a system of the above mentioned kind having, compared with the arrangements heretofore known, remarkable advantages both from the structural and operational viewpoint.

According to the invention, there is provided an assembly comprising a guide axially placed to the track, and formed by a plurality of segments arranged in continuity one to another, carried by spaced supports and placed on the plane of symmetry of the track, and means to allow the switching and the crossing.

The invention will be now described with reference to the attached drawings, showing by way of illustration and not of limitation a preferred embodiment of the invention.

In the drawings:

FIG. 1 is a schematic cross sectional view of the guide member;

FIG. 2 is a fragmentary side view of the guide member;

FIG. 3 is a view similar to FIG. 1, showing a second embodiment of the guide member, in a cutaway along the plane III—III of FIG. 2;

FIG. 4 is a sectional view along the plane IV—IV of FIG. 3;

FIG. 5 is a sectional view along the plane V—V of FIG. 2;

FIG. 6 is a schematic plan view of the switching arrangement;

FIG. 7 shows the sequence of the sections indicated with the letters *a* to *e* in FIG. 6;

FIG. 8 shows in a schematical form the crossing arrangement between two lines.

In the system being described, the track does not present particular features and therefore it can be made of any suitable material. Only for special sections, such as switches, crossings and so on, it is made of metallic material.

With reference to FIGURES 1 and 2, the guide member comprises the supports 1, secured to the plane of the track and obtained from insulating material, to which are anchored the section irons 2 having a T-shaped cross section, so arranged as to be insulated both from the ground and one from another.

The section irons 2 form the bipolar electric line which directly feeds the vehicles.

A horizontal plate 3 of insulating material, closes at the top the guide member and forms an insulated support for the conductors 4 and 5 which can be used for different requirements concerning the traction; for instance as signalling and ground conductors.

On the vertical faces of the section irons 2 adhere the vertical-axle wheels 6, which wheels being secured to the vehicle, always in pairs and in a suitable number, force the vehicle to follow the track.

FIGURES 3 and 4 show respectively in cross and longitudinal section the guide at one support, as well as the electric conductors, the whole according to an embodiment wherein, as dielectric materials, use is made of insulating materials capable of being bonded to the iron, for example materials comprising polyester resins. In FIGURES 3 and 4, the parts indicated by the reference numerals 2 to 6 are similar to those already described in FIGURE 1, and carry the same reference numeral. In the case of FIGURES 3 and 4, as supporting structure there is provided a short bar 11 of section iron, having a nearly omega-shaped cross section, partially covered with insulating material 10, the support proper 12, having the same length as the bar 11, and which can be formed by two iron plates welded one to another, one flat and the other one having a U-shape, as shown in FIGURE 4, and finally clamping bolts 13 which serve to clamp between the members 11 and 12 the horizontal wings of the section irons 2. Also the support 12 is partially covered with insulating material. The bond of the assembly is ensured not only by the bolts 13, but also by the adhesion between the metallic material and the dielectric material.

The guide, like the track rails, is divided into segments or bars; each bar is supported by the supports 1, suitably spaced one from another. Of the supports 1 of each bar, only one is anchored to the ground or to the scaffolding in case of roadway on viaduct.

The other supports are elastic, in the sense that they permit thermal changes in length, so as to avoid the setting up of considerably axial stresses in the guide. The elasticity of the supports is provided by rubber plates 14, which clamp between them the lower horizontal portion of the support and which are in their turn clamped between the metal plates 15 and 16. The latter are fastened on the ground, or on the scaffolding of the viaduct, and permit the movement of the support only in the running direction of the vehicles.

In FIGURE 5 there is shown the cross section of the guide member in the sections included between a support and another one. In said figure, besides the elements already described, there is shown the vertical partition plate 17 of insulating material running along the guide between one support and another one, and resting, with two discontinuous extensions 18, on the section irons 2. There are provided thereby two recesses A and B running inside the guide throughout its length, each of which has at its interior insulating or insulated surfaces both to the ground and the voltage of the section iron 2 of the other recess.

Therefore in said recesses can be placed bare conductors of copper or aluminum, designated by the numerals 8 and 9, parallel operating with the section irons 2.

The arrows of FIGURE 5 indicate the air circulation which, as the result of heating, sets up in the recesses A and B.

Now it will be described the switch, which is a basic member of any traction system with vehicles guided by the roadway.

Heretofore, for railroad vehicles equipped with pneumatic tires, there have been fabricated switches only for roadways having two side guides and wheels inside them.

The adoption of the axial guide and of guided wheels external to the guide, according to the invention being described, substantially modifies the switching problem.

The rectangle A, B, C, D of FIGURE 6 encloses that roadway portion, at the switch, which will exhibit different guide and track arrangements, depending on if the switch is to be set for a straight line or shunt operation.

Therefore, there are provided two different roadway portions, secured on supports lying in different planes, for example perpendicular, which portions can rotate about a longitudinal axle 19, parallel to the plane of the roadway, replacing one for another. Thus, it will be possible that one portion lies in a working position whereas the other remains discarded within the pit 22 which accommodates the entire rotating assembly. The opening of said pit, at the track, will have the form of a rectangle circumscribed to the rectangle ABCD, with a minor clearance.

The supports are formed by the two sides of the connecting angles 20, all identical, shown in FIGURES 6 and 7, in different number depending on the characteristics of the switch and the vehicles (in the above mentioned figures they are five in number, each designated by the numeral 20, followed by the letters *a* to *e*).

The connecting angles are fitted on the axle 19.

In FIGURE 6 the switch is arranged for a straight-line operation; the guide and the track are represented by a full line and dashed line (vertical for the guide and diagonal for the track).

In the same figure there is shown, with a thin dashed line, the position taken by the guide and the track upon the setting out in a shunted direction.

Also in FIGURE 7 the switch is arranged for a straight line operation.

By a counterclockwise rotation, the switch will be set for a shunt operation.

When the switch is set for a straight line operation, the weight of the vehicles passed thereon will co-operate to lock the switch in such a position. On the contrary, when the switch is set for shunt operation, in the portion thereof which is on bend (connecting angles 20*a*, 20*b* and 20*c*), while the centrifugal stress of the vehicles co-operates to the stability of the switch, the weight of the same has an adverse effect which becomes null and therefore favorable in the right-line portion of the switch (connecting angles 20*d* and 20*e*).

Therefore, it is necessary that switch-locks are available, on which to rely upon for the stability in the two positions. They are schematically indicated with numeral 21 in FIGURE 7, connecting angles 20*a* and 20*e*. The switch-locks can be readily provided by means of bars coming out from the front walls (sides AC and BD), and entering recesses formed in the connecting angles 20*a* and 20*e*.

The roadway portion, effected by the switch, has been defined by the rectangle ABCD in order to simplify the description and the figures, as well as for uniformity with the oblique crossing as per the following paragraph. However, in effect, the confinement can be enclosed in a smaller area by maintaining the side AC at a fixed value and reducing the side BD (said reduction varying with the cross dimensions of the roadway).

Therefore, said portion could take a trapezoidal shape.

With said shape and by a suitable choice of the planimetrical position of the axle 19, it is possible to obtain that the weight and the centrifugal stress of the vehicles cooperate to lock the switch even when the latter is set for a shunt operation.

In this connection the switch-locks represent an extra safety.

With the reduction of the trapezoidal area, all the connecting angles take different dimensions and the pivoting axle 19 is inclined to the plane of the track.

With an arrangement quite similar to that described for the switch, there is provided also the oblique crossing. Said arrangement is shown in a plan view in FIGURE 8. The connecting angles are identical to those of the switch designated in FIGURE 7 by the numeral 20.

For the crossing are essential the locking devices of the rotating portion in each of the two working positions.

The present invention has been described in a preferred embodiment thereof, being however understood that changes and alterations could be made in practice therein without departing from the scope of the invention.

What is claimed is:

1. A guiding arrangement for railroad-type vehicles equipped with pneumatic tires rolling on a track, comprising in combination support elements spaced from one another arranged on the plane of symmetry of the track, a plurality of guide elements having a substantially square overall cross section, arranged in continuity following one another, carried by said support elements to form a continuous guiding rail longitudinally extending with respect to the track, said guide elements having two opposite and parallel vertical faces made of conductive materials insulated from one another and from said support elements by means of layers of dielectric materials and cooperating with corresponding pairs of vertical-axis wheels of the vehicles to force the vehicles to follow the path defined by said guide rail, said parallel vertical faces forming a bipolar feed system for the vehicles, switching and crossing means for the vehicles arranged on switching and crossing zones of the track consisting of a plurality of rotary support elements carrying on their two faces lying at a right angle to one another said guide elements, said guide elements being interchangeable therebetween by rotating said rotary support elements, a longitudinal axle passing through said rotary support elements and rigidly connected thereto for rotating said rotary support elements from one to another railway direction and a continuous longitudinal housing containing said rotary support elements and longitudinal axle, said rotary support elements resting in each operative position on the bottom of said housing.

2. Arrangement according to claim 1, wherein each element of the guide rail carries two continuous plates of insulating material, one horizontally placed at the top of the guide rail and the other arranged in the longitudinal axial plane of said guide rail, to define in cooperation with said condutive side faces, two recesses symmetrical to the axial plane, electrically insulated from one another and to the ground, conductors in said ground in parallel with said opposite conductive faces.

3. Arrangement according to claim 2, wherein said conductive faces comprise a pair of angle irons, symmetrically arranged with said faces.

4. Arrangement according to claim 3 wherein said angle irons are T shaped in cross section with the foot registering with said faces.

5. Arrangement according to claim 2 wherein said continuous insulating plate placed at the top of the guide rail carries continuous electric conductors, insulated from one another and the ground, for feeding additional circuits concerning traction and signalling.

6. Arrangement according to claim 2 wherein said supporting elements of each guide element at the surface of the track comprise two horizontal plates of elastic material, a horizontal portion of the support clamped by said horizontal plates and two metal plates fastened at the plane of the track clamping said horizontal plates, so as to permit only thermal expansion movements in an axial direction and parallel to the track.

7. Arrangement according to claim 1, wherein between said spaced supports there is interposed a rigid support, fixedly anchored to the track and placed at the center of each element of the guide rail.

8. Arrangement according to claim 1, wherein said rotary support elements carries side tracks for pneumatic tires with increasing and decreasing width in dependence on the switching direction.

9. Arrangement according to claim 1, wherein said rotary support elements are provided with a locking device, to secure said guiding rail and track in the respective working positions.

References Cited by the Examiner

UNITED STATES PATENTS

| | | | |
|---|---|---|---|
| 557,339 | 3/1896 | Osborne | 246—431 |
| 1,329,304 | 1/1920 | McClure et al. | 104—118 |
| 1,623,920 | 4/1927 | Harris | 191—32 |
| 2,619,553 | 11/1952 | Kroeckel | 191—32 |
| 2,954,743 | 10/1960 | Henderson | 104—93 |
| 3,106,898 | 10/1963 | Prosin | 104—130 |

FOREIGN PATENTS

| | | |
|---|---|---|
| 167,507 | 12/1953 | Australia. |
| 550,219 | 12/1957 | Canada. |
| 1,155,765 | 12/1957 | France. |
| 758,226 | 10/1956 | Great Britain. |

ARTHUR L. LA POINT, *Primary Examiner.*

S. B. GREEN, *Assistant Examiner.*